United States Patent
Sugawara (10) Patent No.: US 6,522,816 B1
(45) Date of Patent: Feb. 18, 2003

(54) OPTICAL FIBER BUNDLE ARRAY COMPONENT

(75) Inventor: Takeo Sugawara, Hamamatsu (JP)

(73) Assignee: Hamamatsu Photonics K.K., Hamamatsu (JP)

(*) Notice: Subject to any disclaimer, the term of this patent is extended or adjusted under 35 U.S.C. 154(b) by 0 days.

(21) Appl. No.: 09/632,807

(22) Filed: Aug. 4, 2000

Related U.S. Application Data (63) Continuation-in-part of application No. PCT/JP99/00508, filed on Feb. 5, 1999.

(30) Foreign Application Priority Data

Feb. 5, 1998 (JP) .............................................. 10-024608

(51) Int. Cl.$^7$ ................................................. G02B 6/02
(52) U.S. Cl. ........................ 385/116; 385/115; 385/120; 385/146; 385/901
(58) Field of Search .......................... 385/126, 54, 115, 385/116, 120, 121, 147, 146

(56) References Cited

U.S. PATENT DOCUMENTS

| | | | | |
|---|---|---|---|---|
| 3,204,326 A | * | 9/1965 | Granitsas .................. | 29/155.5 |
| 4,818,860 A | * | 4/1989 | Hasegawa .................. | 250/227 |
| 4,844,589 A | | 7/1989 | Asahara et al. ............ | 350/413 |
| 5,111,525 A | * | 5/1992 | Hartouni .................... | 385/126 |
| 5,222,180 A | * | 6/1993 | Kunder et al. ............. | 385/115 |
| 5,933,560 A | * | 8/1999 | Ishiharada et al. .......... | 385/115 |
| 6,041,154 A | * | 3/2000 | Ono et al. .................. | 385/116 |
| 6,064,055 A | * | 5/2000 | Dorko ....................... | 250/214 |

FOREIGN PATENT DOCUMENTS

| JP | 41-18867 | 10/1966 | ................ 350/147 |
|---|---|---|---|
| JP | 49-29652 | 7/1972 | ................ 385/147 |
| JP | 63-110402 | 5/1988 | ................ 385/147 |
| JP | 6-90333 | 11/1994 | ................ 385/147 |
| JP | 9-90143 | 4/1997 | ................ 385/124 |
| JP | 10-197805 | 7/1998 | ................ 385/147 |

* cited by examiner

*Primary Examiner*—Brian Healy
(74) *Attorney, Agent, or Firm*—Morgan, Lewis & Bockius LLP

(57) ABSTRACT

An optical component 10 is constructed in such structure that a plurality of optical fibers are arranged in parallel to each other and the component has an entrance surface 10*a* obliquely cut relative to the optical axis and an exit surface 10*b* normally cut relative to the optical axis. The cross section of the optical component 10 is shaped so that optical fiber pairs, each pair being such a combination of two optical fibers with cores 14 of semicircular cross section as to form a substantially circular cross section, are arranged regularly. Orientation of two semicircular cores 14 forming the optical fiber pair is random in each optical fiber pair. Cladding 16 of each optical fiber is provided so as to be integrated by a heating and pressing process to fill a clearance between cores 14 of two optical fibers forming the optical fiber pair of interest and clearances between adjacent optical fiber pairs.

4 Claims, 10 Drawing Sheets

OPTICAL FIBER BUNDLE ARRAY COMPONENT

RELATED APPLICATION

This is a Continuation-In-part application of International Patent application serial No. PCT/JP99/00508 filed on Feb. 5, 1999, now pending.

BACKGROUND OF THE INVENTION

1. Field of the Invention

The present invention relates to an optical component with a plurality of optical fibers arranged therein.

2. Related Background Art

Optical components composed of an array of optical fibers are commonly known as optical components for transmitting an optical image. Such optical components have an entrance surface and an exit surface in which the core and cladding of each optical fiber are exposed, and enable transmission of an optical image into the entrance surface to the exit surface.

Since the above-stated optical components have such a variety of advantages as high transmission efficiency, the potential for smaller size of the optical system in comparison with lenses, and so on, they are utilized in various fields including fingerprint detectors.

SUMMARY OF THE INVENTION

The above optical components are produced normally by bundling an array of optical fibers of circular or square cross section and effecting integral molding thereof. Therefore, the pressure during the integral molding deforms the cross section of the cores of optical fibers forming the optical components, into a polygonal shape having opposite sides parallel to each other, such as the square, the hexagon, and so on, which will pose the problem as described below.

Namely, light incident at a specific angle of incidence to the entrance surface is repeatedly reflected by the opposite surfaces parallel to each other and is emergent at a specific angle of emergence from the exit surface. As a consequence, an output image emerging from the exit surface comes to demonstrate a pattern having the intensity at only the specific angle of emergence, and this pattern constitutes noise to degrade the resolution power of the optical components.

An object of the present invention is, therefore, to provide an optical component with high resolution power by preventing the occurrence of pattern noise while solving the above problem.

For accomplishing the above object, an optical component of the present invention is an optical component comprising an array of optical fibers, wherein a cross-sectional profile of a core of each optical fiber is substantially sectorial. When the cross-sectional profile of the core of each optical fiber is substantially sectorial, the light traveling in the core is prevented from traveling with being reflected by only the parallel opposite surfaces in the core, thereby avoiding the formation of the pattern having the intensity at only the specific angle of emergence. As a result, the pattern noise is prevented from occurring, whereby the output image can be obtained with high resolution.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1A:
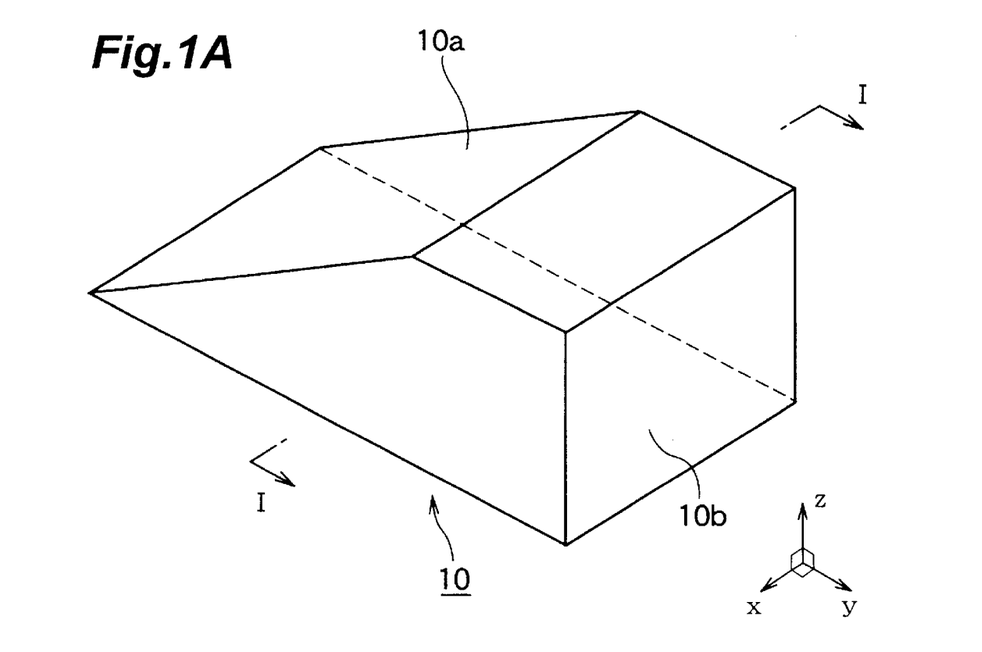
FIG. 1A is a perspective view of the optical component according to the first embodiment of the present invention.

The optical component according to the first embodiment of the present invention will be described with reference to the drawings. First, the structure of the optical component according to the present embodiment will be described. FIG. 1A is a perspective view of the optical component according to the present embodiment and FIG. 1B is an enlarged, cross-sectional view along the line I—I (a straight line parallel to the x-axis) of FIG. 1A.

The optical component 10 is constructed in such structure that a plurality of optical fibers the cross-sectional profile of the core of which is of a semicircle (a sector having the center angle of 180°) are arranged in parallel to each other. Each optical fiber is arranged so that the optical axis thereof is parallel to the y-axis of FIG. 1A. The optical component 10 has an entrance surface 10a obliquely cut relative to the optical axis, and an exit surface 10b normally cut relative to the optical axis, and is arranged so as to be able to output a demagnified image of an input pattern incident to the entrance surface 10a, from the exit surface 10b.

Figure 1B:
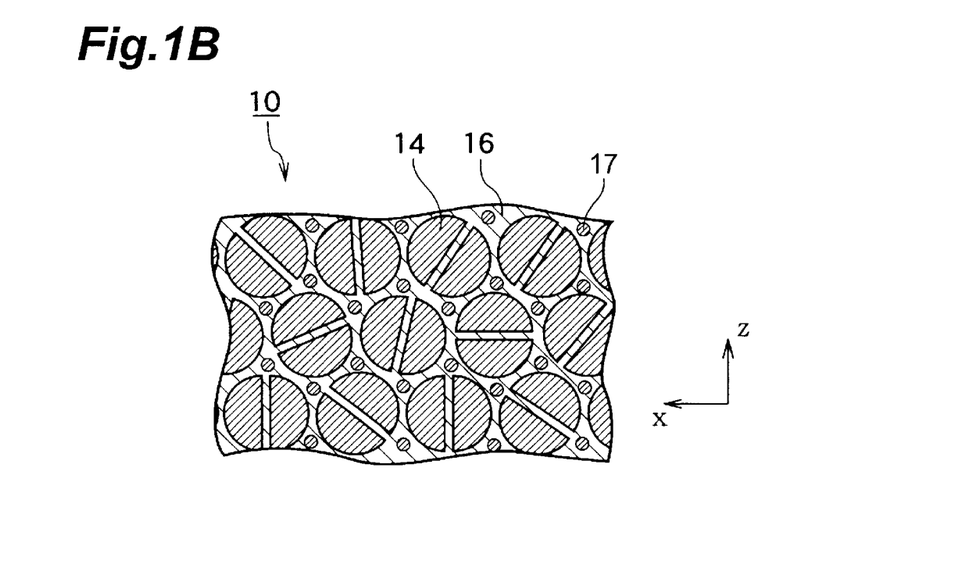
FIG. 1B is an enlarged, cross-sectional view along the line I—I of FIG. 1A.

The cross section of the optical component 10 is as illustrated in FIG. 1B. Namely, optical fiber pairs, each pair being such a combination of two optical fibers, each of which has the core 14 of semicircular cross section, as to form a substantially circular cross section, are arranged regularly. While the optical fiber pairs are arranged regularly, the orientation of two cores 14 having the semicircular, cross-sectional profile, forming the above optical fiber pair, is random in each optical fiber pair, as illustrated in FIG. 1B. In other ward, in the cross-sectional profile, the orientation of cladding 16 between two cores 14 is random in each optical fiber pair. The term "random" herein means that at least one of optical fiber pairs placed adjacent to each other has a different opposing direction of the two cores 14 forming the optical fiber pair of interest. The cladding 16 of each optical fiber is provided so as to be integrated by a heating and pressing process to fill the clearance between the cores 14 of two optical fibers forming each optical fiber pair and the clearances between adjacent optical fiber pairs.

In this case, the cores 14 are made, for example, from a barium-lanthanum base glass having the refractive index of 1.82 and the cladding 16, for example, from a borosilicate glass having the refractive index of 1.495. The diameter of the cores 14 is approximately 6 $\mu$m, and the portion of the cladding 16 in the clearance between the two cores 14 has the thickness of about 0.5 $\mu$m, which is not less than one third of the wavelength (550 nm) normally used in the optical component 10. Further, the adjacent optical fiber pairs are spaced about 0.5 $\mu$m or more through the cladding 16, similar to the portion in the clearance between the cores 14.

Optical absorbers 17 (light-absorbing materials) extending in the axial direction of each optical fiber are disposed in the part of cladding 16. When the optical absorbers 17 are disposed in the part of cladding 16, they can effectively eliminate stray light leaking into the cladding 16 or light entering the optical component 10 from the side (the surfaces other than the entrance surface and exit surface), thereby enhancing the resolution of the output pattern.

Next described is a production method of the optical component according to the present embodiment. FIGS. 2A to 2F are production step diagrams of an optical fiber pair to form the optical component 10 and FIGS. 2G to 2J are cross-sectional views of preforms etc. produced in the respective steps.

Figures 2A, 2B, 2D, 2F, 2G, 2H, 2I, 2J:
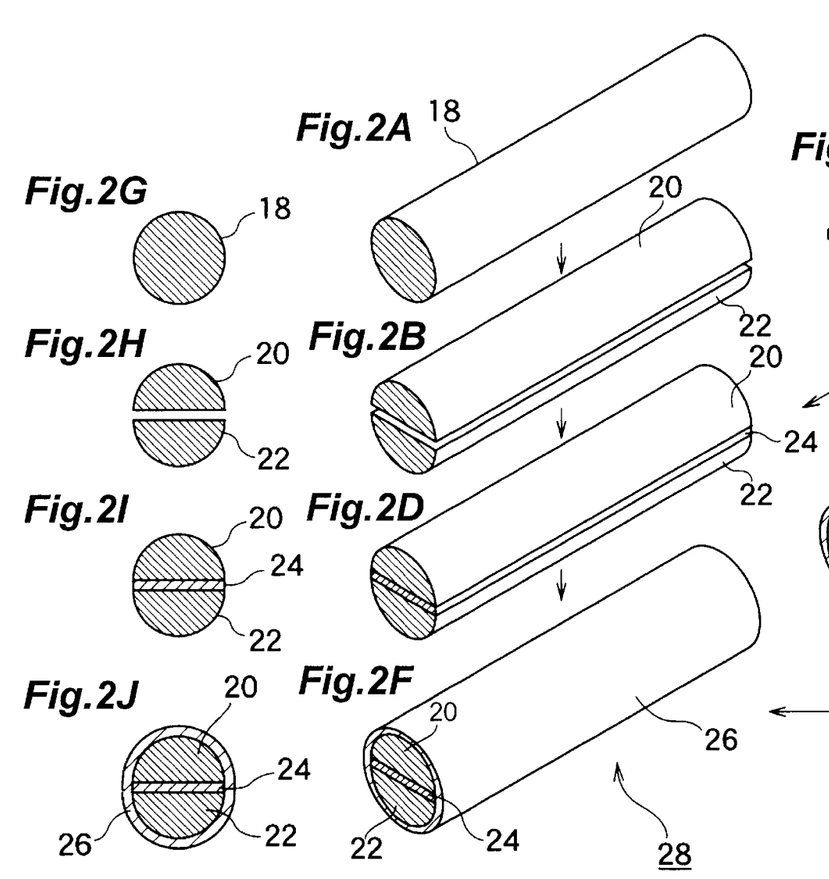
FIGS. 2A to 2F are production step diagrams of an optical fiber pair to form the optical component.
FIGS. 2G to 2J are cross-sectional views of preforms etc. produced in the respective steps.

For producing the optical fibers to constitute the optical component 10, a core preform 18 having the cylindrical shape is first produced in a manner similar to the production of ordinary optical fibers (FIG. 2A and FIG. 2G). The core preform 18 is made, for example, from the barium-lanthanum base glass having the refractive index of 1.82 and the side surface thereof is polished by a method of polishing with ceria or the like.

In the subsequent step, the core preform 18 thus produced in the above step is cut longitudinally (in a direction normal to the bottom surface of the cylindrical shape) by a diamond cutter or the like to obtain two split core preforms 20 and 22 having the semicircular shape (FIG. 2B and FIG. 2H). On this occasion, the cut surfaces are polished by the method of polishing with ceria or the like.

Figures 2C, 2E:
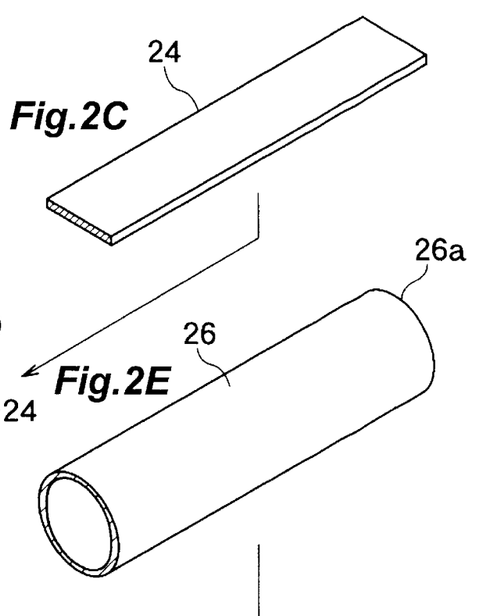

In the next step, a platelike cladding preform 24 as illustrated in FIG. 2C is interposed between the two core preforms 20 and 22 (FIG. 2D and FIG. 2I). The cladding preform 24 herein is made, for example, from the borosilicate glass having the refractive index of 1.495.

In the subsequent step, the sandwich of the platelike cladding preform 24 between the two core preforms 20 and 22, produced in the above step, is put into a cladding preform 26 having a pipe shape as illustrated in FIG. 2E, to form a preform 28 for production of optical fiber pair (FIG. 2F and FIG. 2J). The cladding preform 26 herein is also made, for example, from the borosilicate glass having the refractive index of 1.495 as the above cladding preform 24 was, and one bottom 26a of the cladding preform 26 is sealed by a method of melting with a burner or the like.

Figure 3:
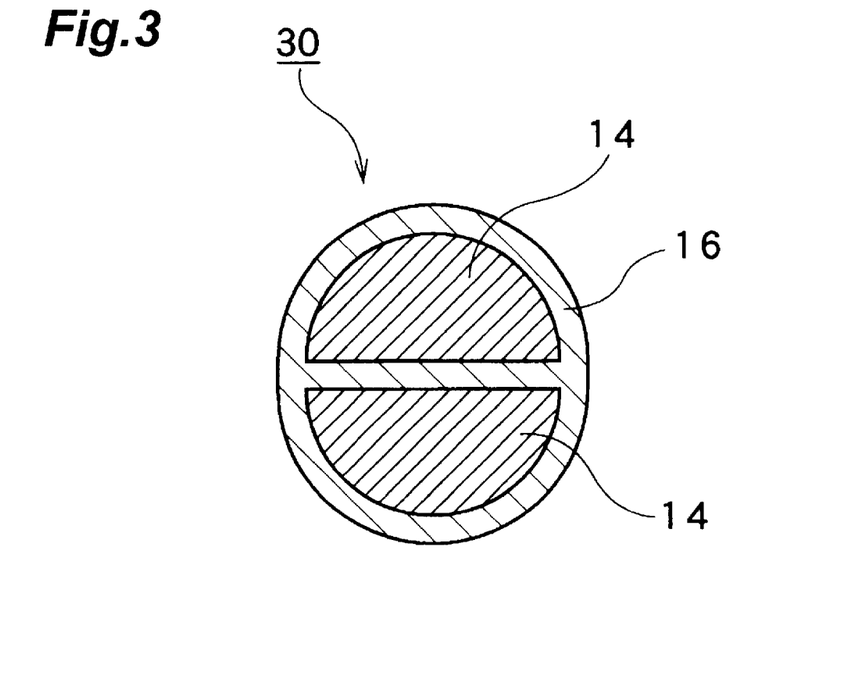
FIG. 3 is an enlarged, cross-sectional view of an optical fiber pair used in production of the optical component.

After that, the above preform 28 is subjected to fiber drawing to produce the optical fiber pair. FIG. 3 shows an enlarged view of the cross section of the optical fiber pair produced by this method. This optical fiber pair 30 is so shaped that the two cores 14 of the semicircular cross section are opposed to each other and that the cladding 16 is provided in the clearance between the two cores 14 and on the periphery of the two cores 14 (the portion other than the above clearance). Here the portion of the cladding 16 around the cores 14 has the thickness enough to fill the clearances relative to adjacent optical fiber pairs 30 in production of the optical component 10. It is desirable that the portion of the cladding 16 provided in the clearance between the two cores 14 have the thickness enough to act as a cladding partition between the two cores 14 and have the thickness of not less than one third of the wavelength of light to be transmitted by the optical component 10. The specific shape of the optical fiber pair 30 is as follows; the diameter of the cores 14 is about 6 $\mu$m, the thickness of the portion of the cladding 16 provided on the periphery of the cores 14 is about 0.25 $\mu$m, and the thickness of the portion of the cladding 16 provided in the clearance between the two cores 14 is about 0.5 $\mu$m in consideration of the use wavelength of 550 nm.

Special care must be taken here on the following: a partition for separating the two cores 14 is sometimes provided for the purpose of changing optical-path directions by index difference; such a partition is very thin and thus does not act as cladding; then the two cores act as one core of circular cross section; therefore, this structure will fail to achieve the action and effect of the present embodiment described hereinafter.

A plurality of optical fiber pairs 30 produced through the above steps are arranged in parallel to each other while the rodlike optical absorbers 17 are interposed properly; then they are subjected to the heating and pressing process to effect the integral molding thereof, thereby producing the optical component 10.

Next, the action of the optical component according to the present embodiment will be described. Let us first discuss the problem of the optical components according to the prior art. The optical components according to the prior art are produced normally by bundling an array of optical fibers of the circular or square cross section in parallel to each other and effecting the integral molding thereof. In order to enhance the resolution power of the optical component, there are cases wherein the optical component is produced by further drawing the above bundled optical fiber group, bundling an array of such fibers (multi-fibers) in parallel, and effecting the integral molding thereof, and there are cases wherein the optical component is produced by repeatedly carrying out the above fiber drawing and bundling steps several times to obtain fiber components (multi-multi-fibers) and effecting the integral molding thereof.

Figures 10A, 10B, 10C, 11A, 11B, 11C, 12A, 12B, 12C:
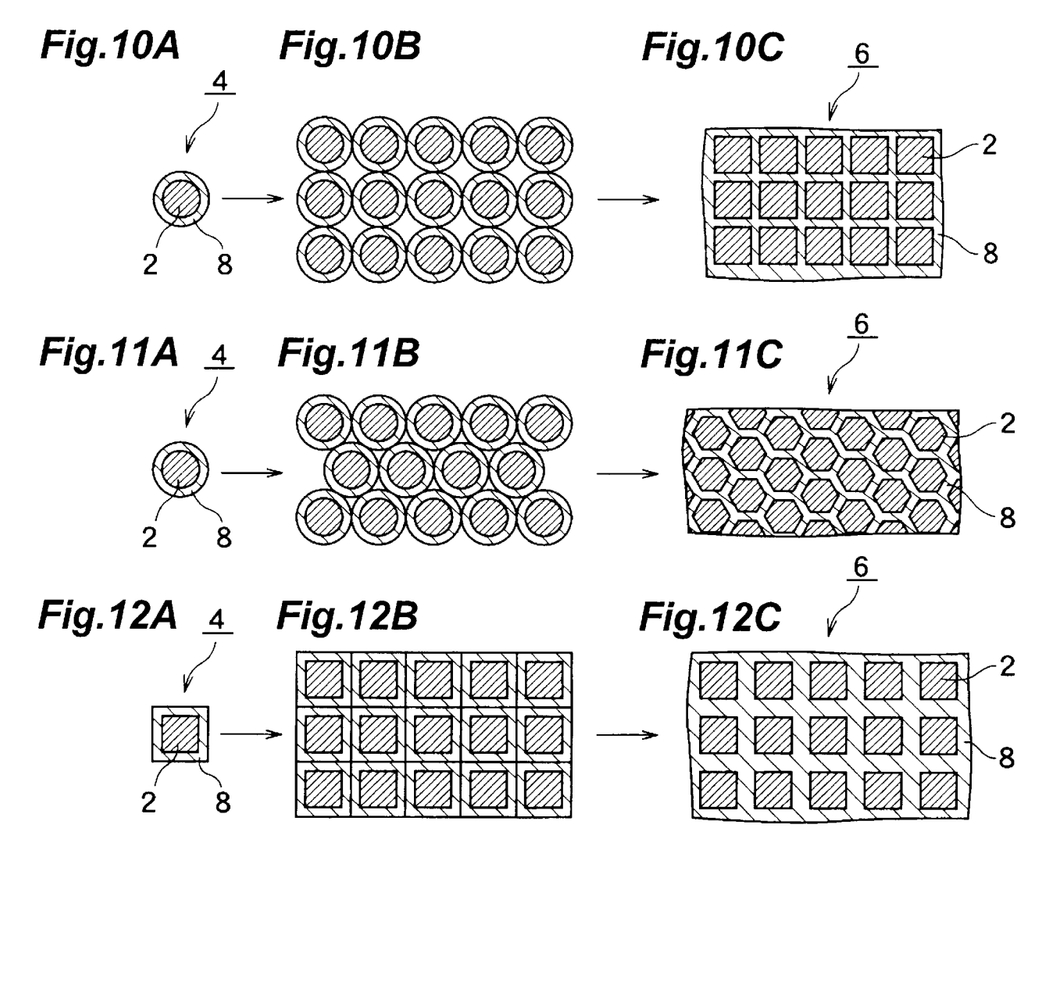
FIGS. 10A to 10C are production step diagrams of the optical component according to the prior art.
FIGS. 11A to 11C are production step diagrams of the optical component according to the prior art.
FIGS. 12A to 12C are production step diagrams of the optical component according to the prior art.

FIGS. 10A to 10C, FIGS. 11A to 11C, and FIGS. 12A to 12C show changes in the cross-sectional profile of the core of each optical fiber in production of the optical components according to the above production method. FIGS. 10A to 10C show changes in the cross-sectional profile of the cores 2, where the optical component 6 is formed by arranging the optical fibers 4 with the cores 2 of the circular cross section in a tetragonal configuration. When the optical component 6 is formed by arranging the optical fibers 4 with the cores 2 of the circular cross section in the tetragonal configuration, the cross section of the core 2 of each optical fiber 4 is deformed into an approximate square by the heating and pressing process for the integral molding of the bundle of optical fibers 4, as illustrated in FIGS. 10A to 10C.

Degrees of the deformation herein differ depending upon the hardness of the cores 2 and cladding layers 8 of the optical fibers 4 under the temperature during the above heating and pressing process. When the cores 2 are extremely harder than the cladding 8, the cross section of the cores 2 can be maintained in the circular shape. It is, however, practically difficult to make the cores 2 extremely harder than the cladding 8, in order to avoid contact between adjacent cores 2.

FIGS. 11A to 11C show changes in the cross-sectional profile of the cores 2, where the optical component 6 is formed by arranging the optical fibers 4 with the cores 2 of the circular cross section in a hexagonal configuration. In this case the cross section of the core of each optical fiber 4 is deformed into an approximately regular hexagonal shape by the heating and pressing process for the integral molding of the bundle of the optical fibers 4. FIGS. 12A to 12C show changes in the cross-sectional profile of the cores 2, where the optical component 6 is formed by arranging the optical fibers 4 with the cores 2 of the square cross section in the tetragonal configuration. In this case, there is no clearance between adjacent cladding portions 8 on the occasion of placement of the optical fibers 4, and thus the cross section of the cores 2 is also maintained in the square shape after the heating and pressing process for the integral molding of the bundle of the optical fibers 4.

Figure 13A:
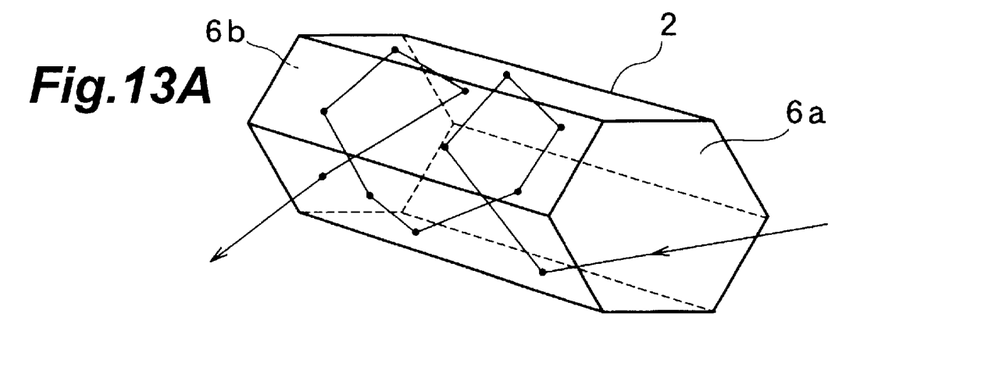
FIGS. 13A to 13C are diagrams to show a traveling state of light in the core of the optical fiber forming the optical component according to the prior art.
Figure 13B:
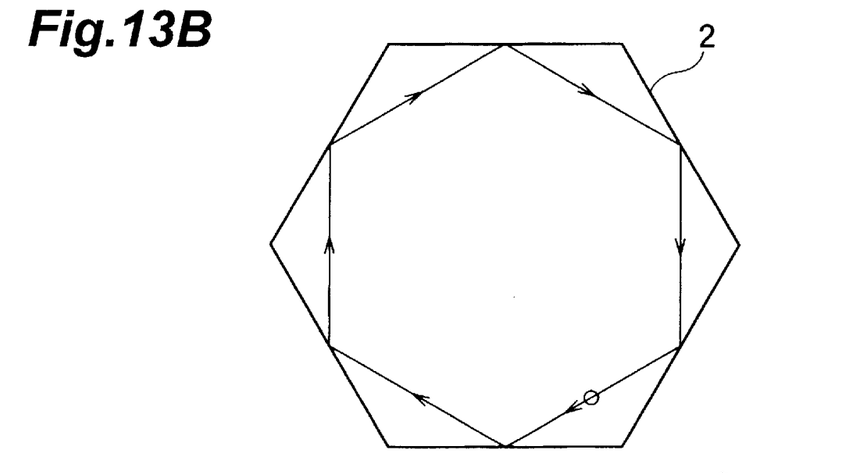
Figure 13C:
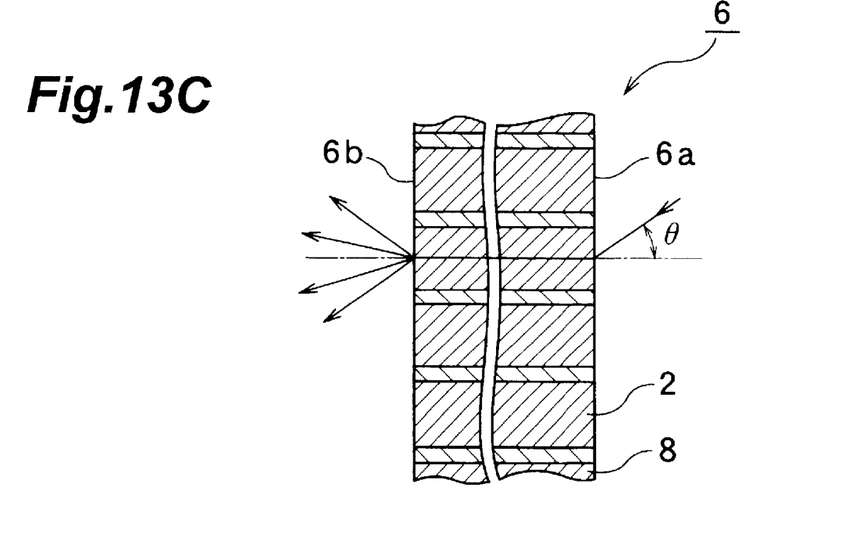
Figure 14A:
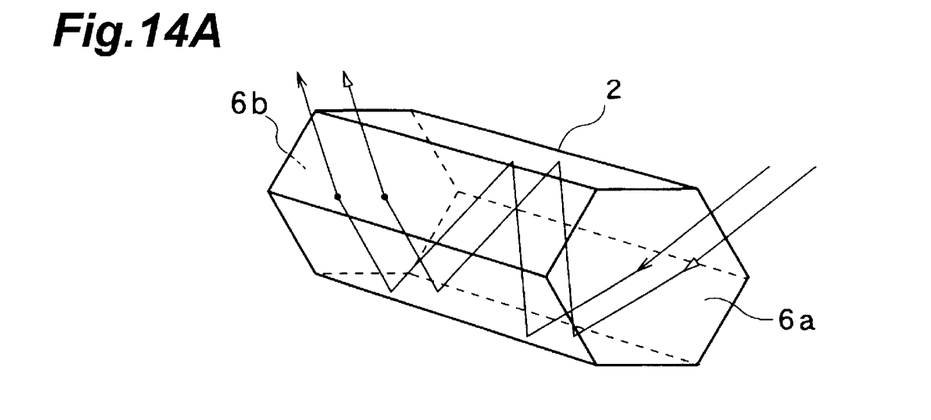
FIGS. 14A to 14C are diagrams to show a traveling state of light in the core of the optical fiber forming the optical component according to the prior art.
Figure 14B:
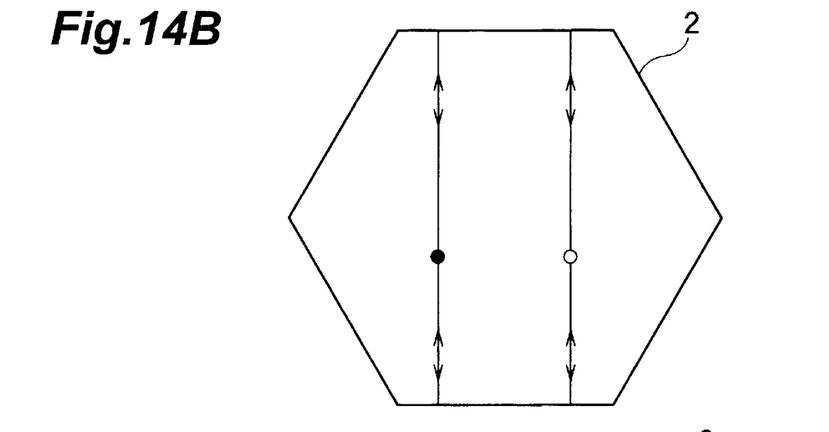
Figure 14C:
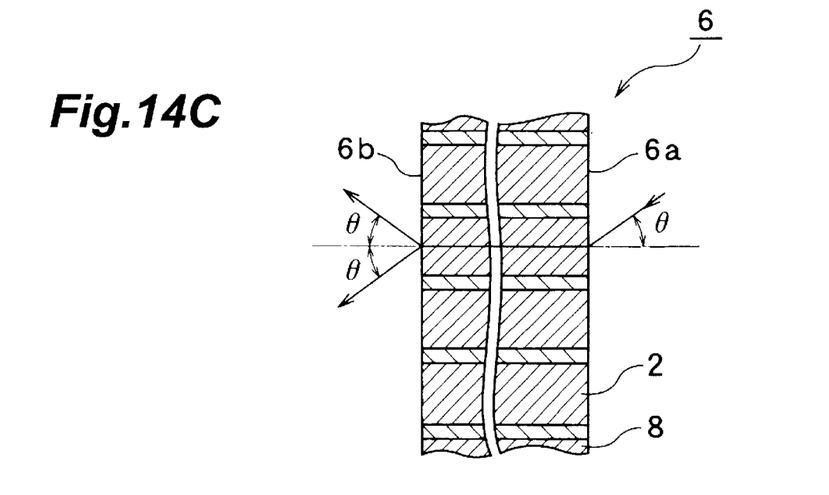

Since the optical components 6 produced as described above are formed in the polygonal shape having the opposite sides parallel to each other, such as the square, the hexagon, or the like, in the cross section of the core 2 of each optical fiber 4, they have the problem as described below. Namely, there are two possible traveling ways in the core 2 for the light incident to the entrance surface of the optical component 6; spiral traveling as illustrated in FIGS. 13A to 13C and strip traveling as illustrated in FIGS. 14A to 14C. Here blank and solid dots in FIGS. 13A to 13C and FIGS. 14A to 14C indicate positions of incidence of light.

FIG. 13A shows the traveling state in the core 2 of the light incident to the entrance surface 6a of the optical component 6 (or the entrance surface of the core 2), and FIG. 13B is a diagram to show a projection of the traveling path of the light on a plane parallel to the entrance surface 6a. As illustrated in FIGS. 13A and 13B, the light incident at a random incident angle (except for the specific incident angle described hereinafter referring to FIGS. 14A to 14C) to the entrance surface 6a of the optical component 6 travels in the spiral path in the core 2. As a result, even if the light is incident at a fixed incident angle θ to the entrance surface 6a of the optical component 6, the light will be emergent at various emergent angles from the exit surface 6b of the optical component 6, depending upon the difference in positions of incidence thereof, as illustrated in FIG. 13C.

On the other hand, the light incident at the specific incident angle (which is an angle of incidence at which the light travels while being reflected by only the parallel opposite surfaces of the core 2) to the entrance surface 6a of the optical component 6 travels in the strip shape in the core 2, as illustrated in FIGS. 14A and 14B. As a result, when the light is incident at the fixed incident angle θ to the entrance surface 6a of the optical component 6, it is also emergent at the emergent angle of θ from the exit surface 6b of the optical component 6, independent of the difference in the positions of incidence thereof, as illustrated in FIG. 14C. Therefore, a pattern having the intensity at only the specific angle of emergence is formed in the output image emerging from the exit surface 6b of the optical component 6, and this pattern will constitute noise to degrade the resolution power of the optical component 6. Particularly, in the case of the optical component produced by the integral molding of the multi-fibers (or the multi-multi-fibers as well), there is the difference in the degrees of deformation of the cores 2 between in the central part and in the peripheral part of the multi-fibers, and this difference in the degrees of deformation causes the pattern noise according to the cross-sectional profile of the multi-fibers, thus heavily degrading the resolution power of the optical component 6.

Figure 4:
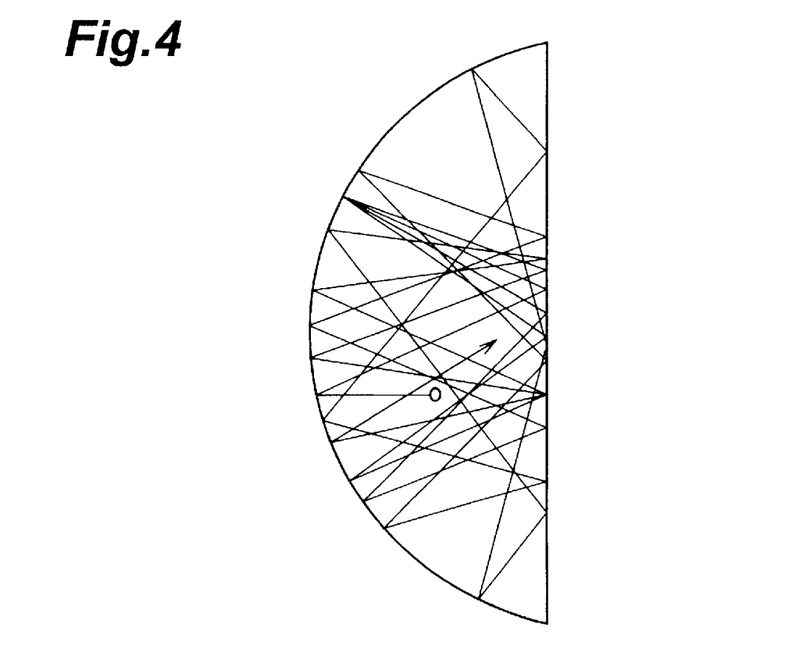
FIG. 4 is a diagram to show a traveling state of light in the core of the optical fiber forming the optical component.
Figure 5:
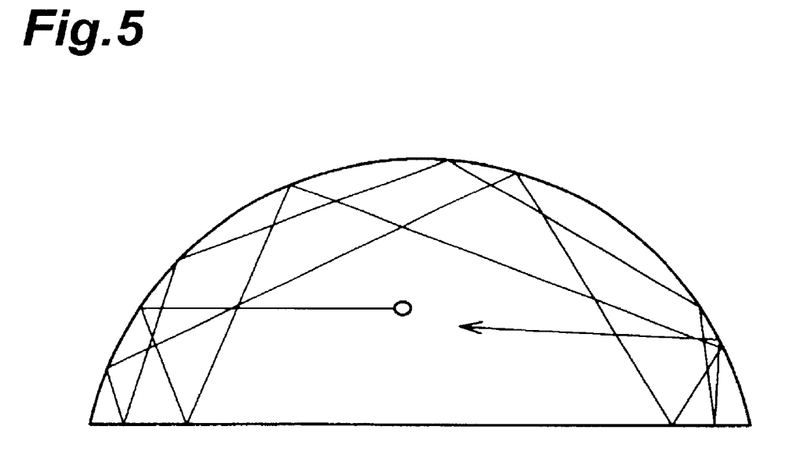
FIG. 5 is a diagram to show a traveling state of light in the core of the optical fiber forming the optical component.

In contrast with it, let us consider the case of the optical component 10 according to the present embodiment. FIG. 4 and FIG. 5 are diagrams to show projections of paths of light entering the entrance surface 10a of the optical component 10 (or the entrance surface of the core 14) and traveling in the core 14, on a plane parallel to the entrance surface 10a. Here blank dots in FIG. 4 and FIG. 5 indicate positions of incidence of the light. Since the cross section of the core 14 is of the semicircular shape without the opposite sides parallel to each other, the optical component is free from the phenomenon that the light incident to the entrance surface 10a of the optical component 10 travels in the strip shape with being reflected by only the parallel opposite surfaces of the core 14. As apparent from the paths illustrated in FIG. 4 and FIG. 5, the light traveling in the core 14 is incident at various angles to the interface between the core 14 and the cladding 16 and is reflected at various angles.

Therefore, even if the light is incident at the fixed incident angle θ to the entrance surface 10a of the optical component 10, the light will be emergent at various emergent angles from the exit surface 10b of the optical component 10, depending upon the difference in the positions of incidence, whereby the pattern having the intensity at only the specific emergent angle is prevented from being formed.

Next, the effect of the optical component according to the present embodiment will be described. Since the cross section of the cores 14 forming the optical component 10 is semicircular, the optical component 10 is free from the formation of the pattern having the intensity at only the specific emergent angle. As a result, the occurrence of the pattern noise can be prevented, so that an optical image with high resolution can be attained from the exit surface 10b of the optical component 10.

Even if in the heating and pressing process the cores 14 should undergo some deformation so as to result in forming parallel opposite sides in part of the cross section of the cores 14, the orientation of the semicircular profile appearing in the cross section of the cores 14 would be random in each optical fiber pair, so that the pattern having the intensity at only the specific emergent angle can be prevented from being formed, thereby enabling achievement of the output image with high resolution.

The optical component 10 according to the present embodiment can also be produced by the method described below. FIGS. 6A to 6F are production step diagrams of an optical fiber pair forming the optical component 10, and FIGS. 6G to 6J are cross-sectional views of preforms etc. produced in the respective steps.

Figures 6A, 6B, 6D, 6F:
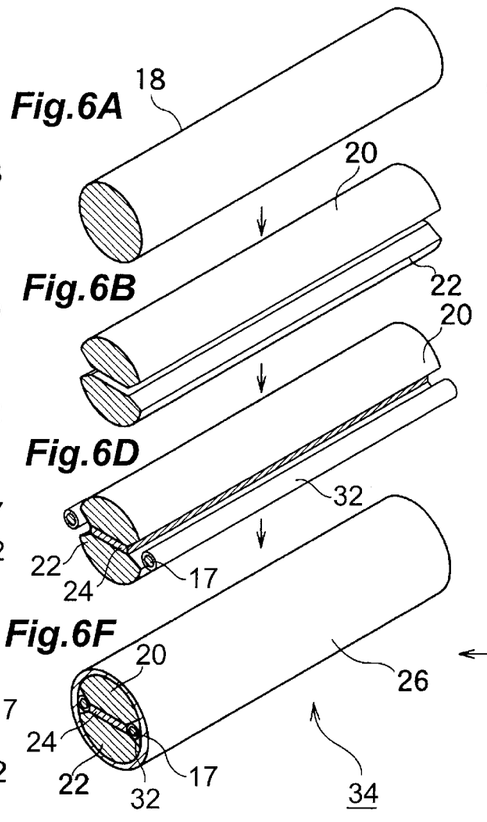
FIGS. 6A to 6F are production step diagrams of an optical fiber pair to form the optical component.
Figures 6C, 6E:
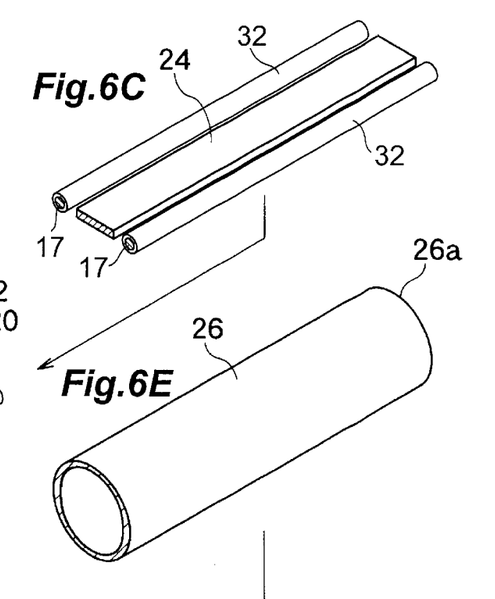
Figure 6G:
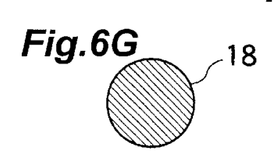
FIGS. 6G to 6J are cross-sectional views of preforms etc. produced in the respective steps.
Figure 6H:
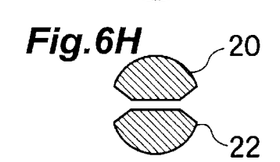
Figure 6I:
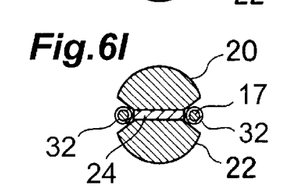
Figure 6J:
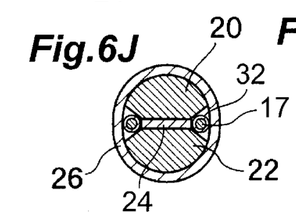

The present production method is different only in the following point from the production method having been described referring to FIGS. 2A to 2J. In the above-stated production method, the platelike cladding preform 24 as illustrated in FIG. 2C was placed between the two core preforms 20 and 22 (FIG. 2D and FIG. 2I), and it was put into the cladding preform 26 to produce the preform 28 for production of optical fiber pair (FIG. 2F and FIG. 2J). In contrast with it, the present production method is a method using the platelike cladding preform 24 and two rodlike members 32 in each of which a rodlike optical absorber 17 is covered with a cladding material, as illustrated in FIG. 6C, wherein the cladding preform 24 is placed between two core preforms 20 and 22, the two rodlike members 32 are placed on the both sides of the cladding preform 24 (FIG. 6D and FIG. 6I), and they are put into the cladding preform 26 to produce the preform 34 for production of optical fiber pair. The preform 34 for production of optical fiber pair is subjected to fiber drawing, and optical fiber pairs thus obtained are arranged in parallel to each other and subjected to the heating and pressing process to effect the integral molding thereof, thereby producing the optical component 10.

Figure 7:
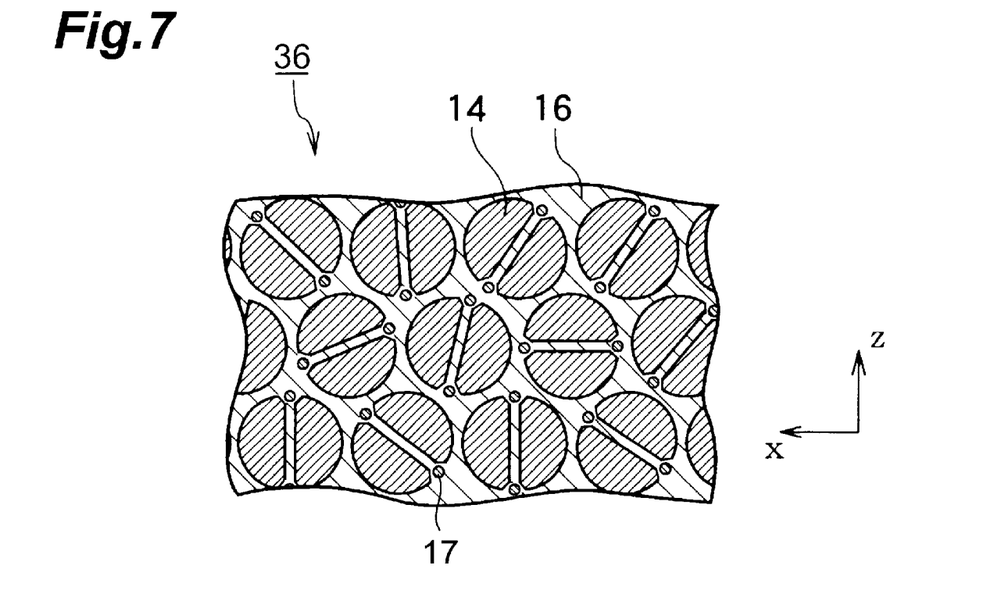
FIG. 7 is an enlarged, cross-sectional view of the optical component according to the first embodiment of the present invention.

The cross-section of the optical component 36 produced by use of the above preform 34 is also shaped so as to include the regularly arranged optical fiber pairs, each optical fiber pair being such a combination of two optical fibers having their respective cores 14 of substantially semicircular cross section as to form the substantially circular cross section, as illustrated in FIG. 7. As a result of execution of the fiber drawing, the heating and pressing process, etc. with the optical absorbers 17 in the preform 34, there appear small depressions at the both ends of the base of each core 14 of the substantially semicircular cross section, but the cross section of the cores 14 can be regarded as being substantially semicircular, because the size of the optical absorbers 17 is extremely smaller than the size of the cores 14 (the length of the base described above).

Figure 8:
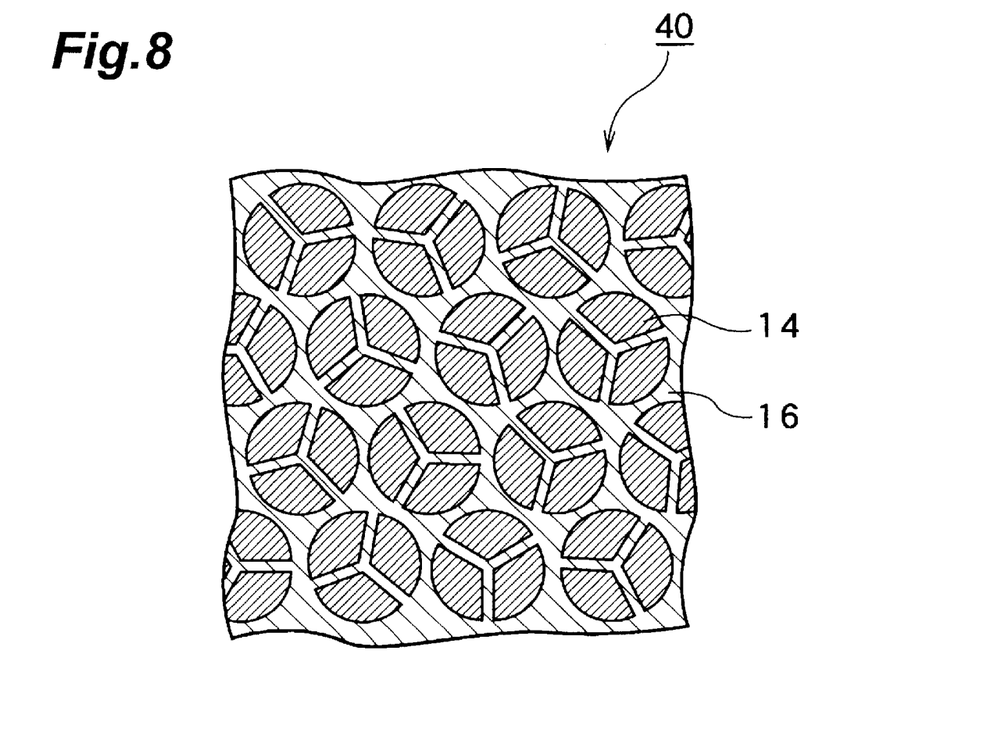
FIG. 8 is an enlarged, cross-sectional view of the optical component according to the second embodiment of the present invention.

Next, the optical component according to the second embodiment of the present invention will be described with reference to the drawings. The optical component 40 according to the present embodiment is structurally different from the optical component 10 according to the first embodiment in that the optical component 10 of the first embodiment had the structure in which the optical fibers with the cores 14 of the semicircular, cross-sectional profile were arranged in parallel to each other, whereas the optical component 40 of the present embodiment has the structure in which a plurality of optical fibers with the cores of a cross-sectional profile of one third of a circle (a sector having the central angle of 120°) are arranged in parallel to each other.

The cross section of the optical component 40 is as illustrated in FIG. 8. Namely, optical fiber sets are arranged regularly so that each optical fiber set is comprised of such a combination of three optical fibers, each of which has the core 14 of the cross section of one third of a circle, as to form the cross section of substantially a circle. The above optical fiber sets are arranged regularly herein, but the orientation of the three cores 14 having the cross-sectional profile of one third of a circle, forming the above optical fiber set, is random in each optical fiber set, as illustrated in FIG. 8. The term "random" herein means that at least one of optical fiber sets placed adjacent to each other is different in directions (or orientation) of the central angles of the three cores 14 forming the optical fiber set. The cladding 16 of each optical fiber is provided so as to be integrated by the heating and pressing process to fill the clearances between the cores 14 of the three optical fibers forming the optical fiber set of interest and the clearances between the adjacent optical fiber sets.

The optical component 40 according to the present embodiment can also be produced by a production method similar to that of the optical component 10 according to the first embodiment.

The optical component 40 according to the present embodiment also demonstrates the action and effect similar to those of the optical component 10 according to the first embodiment, so as to enable attainment of the optical image with high resolution.

Figure 9:
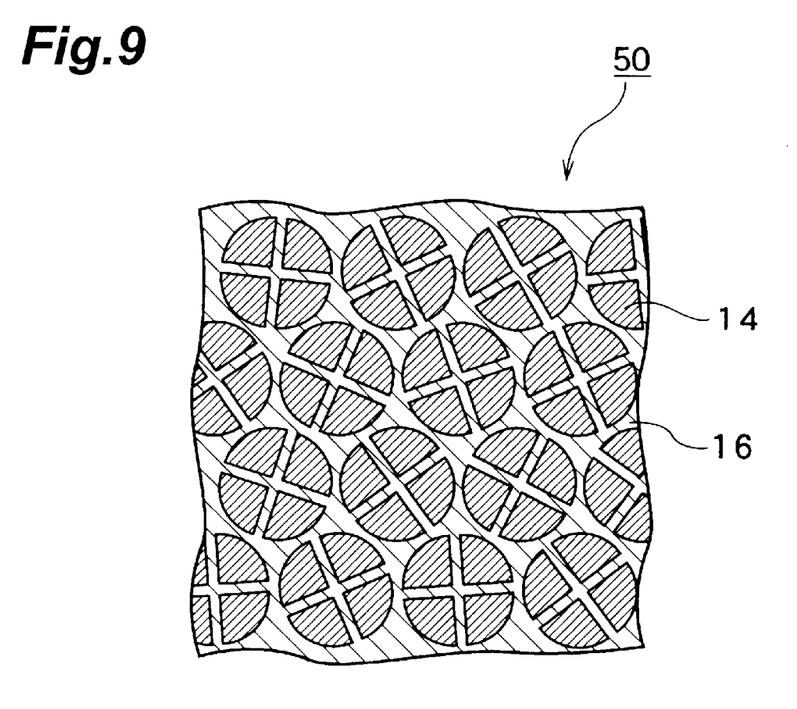
FIG. 9 is an enlarged, cross-sectional view of the optical component according to the third embodiment of the present invention.

Next, the optical component according to the third embodiment of the present invention will be described with reference to the drawings. The optical component 50 according to the present embodiment is structurally different from the optical component 10 according to the first embodiment in that the optical component 10 according to the first embodiment was constructed in the structure in which a plurality of optical fibers with the cores of the semicircular, cross-sectional profile were arranged in parallel to each other, whereas the optical component 50 according to the present embodiment is constructed in such structure that a plurality of optical fibers with the cores of the cross-sectional profile of a quarter circle (a sector having the central angle of 90°) are arranged in parallel to each other.

The cross section of the optical component 50 is as illustrated in FIG. 9. Namely, optical fiber sets are arranged regularly so that each optical fiber set is comprised of such a combination of four optical fibers having their respective cores 14 of the cross section of a quarter circle as to form the substantially circular, cross-sectional profile. The above optical fiber sets are arranged regularly herein, but the orientation of the four cores 14 having the cross-sectional profile of quarter circle, forming the above optical fiber set, is random in each optical fiber set, as illustrated in FIG. 9. The term "random" herein means that at least one of optical fiber sets arranged adjacent to each other is different in directions of the central angles of the four cores 14 forming the optical fiber set. The cladding 16 of each optical fiber is provided so as to be integrated by the heating and pressing process to fill the clearances between the cores 14 of the four optical fibers forming the optical fiber set of interest and the clearances between the adjacent optical fiber sets.

The optical component 50 according to the present embodiment can also be produced by a production method similar to that of the optical component 10 according to the first embodiment.

The optical component 50 according to the present embodiment also demonstrates the action and effect similar to those of the optical component 10 according to the first embodiment and thus enables attainment of the output image with high resolution.

The optical components 10, 36, 40, and 50 according to the above embodiments were the optical components in which a plurality of optical fibers were arranged in parallel, but they may also be provided as optical components of tapered shape in which a plurality of optical fibers are arranged with curvature and by which an optical image incident to the entrance surface is outputted as a magnified or demagnified image.

Since the above optical components have the various advantages of high transmission efficiency, the potential for the smaller size of optics in comparison with lenses, and so on, they can be utilized in the various fields including the fingerprint detectors, radiation detectors, and so on.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component comprising an array of optical fibers,
    wherein a cross-sectional profile of a core of each of said optical fibers is substantially semicircular,
    said optical component comprising an array of optical fiber pairs, each pair being comprised of such a combination of two said optical fibers as to form a substantially circular cross section,
    wherein orientation of two cores having the substantially semicircular, cross-sectional profile, forming said optical fiber pair, is random in each optical fiber pair.

2. An optical component comprising an array of optical fibers,
    wherein a cross-sectional profile of a core of each of said optical fibers is substantially of a sector, the sector having at least one periphery including an arced portion, the arced portion having a central angle of 120°,
    said optical component comprising an array of optical fiber sets, each set being comprised of such a combination of three said optical fibers as to form a substantially circular cross section,
    wherein orientation of three cores having the substantially sectorial, cross-sectional profile, forming said optical fiber set, is random in each optical fiber set.

3. An optical component comprising an array of optical fibers,
    wherein a cross-sectional profile of a core of each of said optical fibers is substantially of a sector, the sector having at least one periphery including an arced portion, the arced portion having a central angle of 90°,
    said optical component comprising an array of optical fiber sets, each set being comprised of such a combination of four said optical fibers as to form a substantially circular cross section,
    wherein orientation of four cores having the substantially sectorial, cross-sectional profile, forming said optical fiber set, is random in each optical fiber set.

4. The optical component according to claim 1, wherein an optical absorber is disposed in cladding of said optical fibers.

* * * * *